United States Patent [19]

Lyon

[11] 4,038,965
[45] Aug. 2, 1977

[54] EVACUATED SOLAR HEAT COLLECTOR
[75] Inventor: Floyd A. Lyon, Brookville, N.Y.
[73] Assignee: Halm Instrument Co., Inc., Glen Head, N.Y.
[21] Appl. No.: 598,549
[22] Filed: July 23, 1975
[51] Int. Cl.² .................................. F24J 3/02
[52] U.S. Cl. .................................. 126/271
[58] Field of Search ............... 126/270, 271; 237/1 A

[56] References Cited
U.S. PATENT DOCUMENTS

| | | | |
|---|---|---|---|
| 1,014,972 | 1/1912 | Nichols | 126/271 |
| 1,661,473 | 3/1928 | Goddard et al. | 126/271 |
| 2,316,191 | 4/1943 | Scott | 126/271 |
| 2,566,327 | 9/1951 | Hallock | 126/270 |
| 2,594,232 | 4/1952 | Stockstill | 126/271 |
| 2,907,318 | 10/1959 | Awot | 126/271 |
| 3,227,153 | 1/1966 | Godel et al. | 126/271 |
| 3,303,838 | 2/1967 | Thomason | 126/271 |
| 3,916,871 | 11/1975 | Estes et al. | 126/271 |

Primary Examiner—Kenneth W. Sprague
Assistant Examiner—James C. Yeung
Attorney, Agent, or Firm—James P. Malone

[57] ABSTRACT

In a solar heat collector. A shallow hollow member. A transparent cover for said member. A plurality of load bearing partitions in said hollow member. A plurality of heat collecting plates are spaced between said partitions. A plurality of water pipes are each connected along one of said collector plates and the water pipes are connected in parallel. Inlet and outlet water pipes means are connected to the parallel connected pipes. The outlet pipe connection has an expansion loop to compensate for temperature variations. Vacuum is applied to the hollow member. The partitions are proportioned and spaced so as to support the cover against external atmospheric pressure. Conduction and convection losses from said heat collector plates are minimized because of the vacuum.

4 Claims, 6 Drawing Figures

EVACUATED SOLAR HEAT COLLECTOR

This invention relates to solar heat collectors for collecting heat from the sun's rays.

Solar heat collectors are being increasingly utilized at the present time due to the energy shortage. Conventional solar heat collectors are mounted on the roof of a building to collect heat from the sun's rays. The heat is collected by a black collector plate or plates which are mounted under a protective cover. Mounted under the heat plate are copper water pipes through which water is passed to remove the heat from the collector and transmit it to hot water utilization devices.

There are several sources of heat losses from conventional collector systems, namely, conduction, convection and radiation. The present invention is concerned with the first two above mentioned losses.

In the present invention, the heat collector is mounted in a vacuum and the conduction and convection losses are minimized so that they are negligible. One of the problems connected with mounting the heat collector in a vacuum is that it is a relatively large shallow structure and if it is evacuated completely there is an atmospheric pressure of approximately 1 ton per square foot on the collector enclosure. The present invention provides an enclosure structure which will permit the heat collector enclosure to be evacuated and still withstand the atmospheric pressure.

In the present invention, a plurality of elongated collector plates are mounted in parallel relation inside a shallow enclosure with a transparent cover. In order to support the cover against the atmospheric pressure, load bearing partitions are mounted between the heat collector plates. Parallel water pipes pass under each heat collector for the purpose of transmitting heat and the outlet water connection has an expansion joint to compensate for temperature variation. Vacuum is applied to the enclosure for the purpose of minimizing the conduction and the convection losses from the heat collector plates.

Accordingly, a principal object of the invention is to provide new and improved solar heat collector means.

Another object of the invention is to provide new and improved solar heat collector means wherein the heat collector means is mounted in a vacuum.

Another object of the invention is to provide new and improved solar heat collector means wherein the heat collectors are mounted in a vacuum and wherein the enclosure is sufficiently strong to withstand atmospheric pressure.

Another object of the invention is to provide new and improved solar heat collector means comprising, a shallow hollow member, a transparent cover connected on said member, a plurality of load bearing partitions in said hollow member, said cover resting on said partitions, a plurality of heat collecting plates in said hollow member spaced between said partitions, a plurality of water pipes each connected along one of said collector plates, said water pipes being connected in parallel, inlet and outlet water pipe means connected to said parallel connected pipes, and means connected to apply vacuum to said hollow member, said partitions being apertured so that the entire hollow member may be evacuated, said partitions being proportioned and spaced so as to support the cover against external atmospheric pressure, whereby conduction and convection losses from said heat collector plates will be minimized because of the vacuum.

These and other objects of the invention will be apparent from the following specification and drawings of which:

Figure 1:
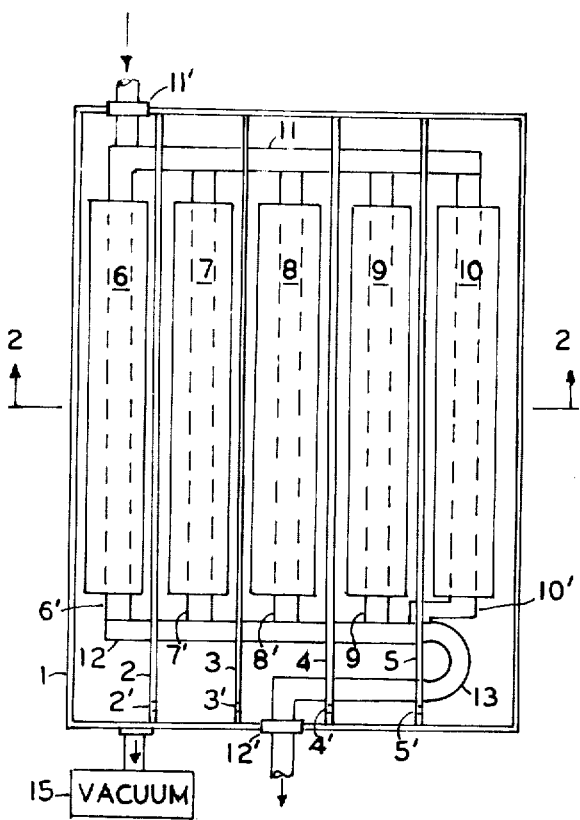
FIG. 1 is a top view of an embodiment of the invention.
Figure 2:
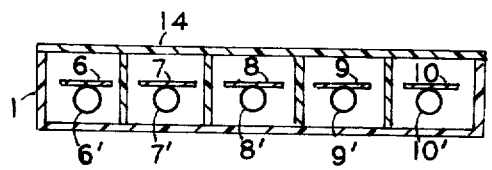
FIG. 2 is a sectional view taken along the line 2-2 of FIG. 1.

Referring to the figures, the invention generally comprises a shallow hollow member 1, which may be of aluminum, plastic or other material. The hollow member enclosure has a plurality of partitions, 2, 3, 4, 5, etc., which have apertures 2', 3', 4', 5', etc., so that the entire enclosure may be evacuated. A plurality of black heat collector plates 6, 7, 8, 9, and 10, are mounted on a plurality of water pipes 6' to 10'. The plates are preferably soldered on to copper water pipes for good heat transmission. The pipes 6' to 10' are connected in parallel between an inlet water header 11 and outlet water header 12. The outlet water header is connected to an expansion loop 13.

The water pipe-collector assembly is mounted in the enclosure 1, at the inlet and outlet seals 11' and 12'. A transparent cover 14 is mounted on top of the hollow member 1, preferably with a gasket so as to provide a good seal. The enclosure is evacuated by a source of vacuum 15 connected to the enclosure.

The partitions, 2 to 5 are proportioned and spaced so as to withstand the atmospheric pressure of more than one ton per square foot on the enclosure. The cover 14 is of transparent material such as glass or clear plastic.

Since the heat collector plates are operating in a vacuum the conduction and convection heat losses will be minimized to a negligible value.

Figure 3:
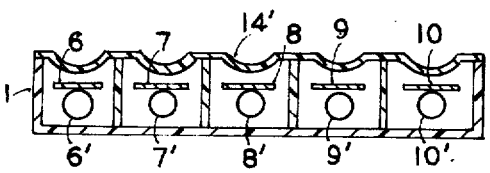
FIG. 3 is a sectional view of a modification of the invention.

FIG. 3 shows a modification of the invention. In FIG. 3, the transparent cover 14' has a modular inwardly curved configuration.

Figure 4:
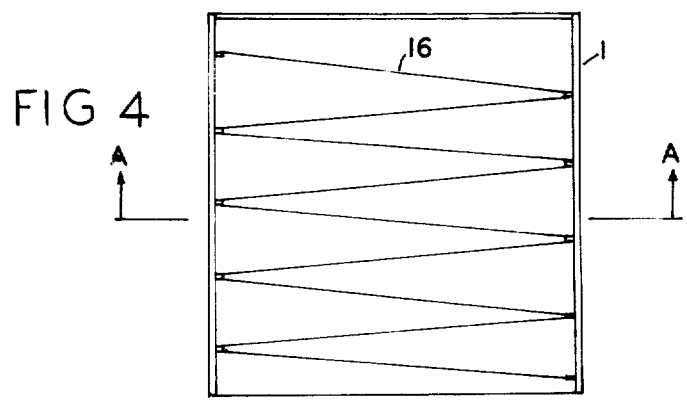
FIG. 4 is a top view of a modification.
Figure 4A:
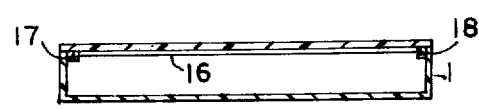
FIG. 4A is a sectional view of FIG. 4.

FIGS. 4 and 4A shows a modification of the invention using thin strong wires 16, for instance, music wire under tension to strengthen the cover. Wire is stretched through eyes 17 and 18 and mounted on the member 1. The wire is thin and causes negligible interference with the radiation. The wire will be under tension when resisting the external atmospheric pressure.

Figure 5:
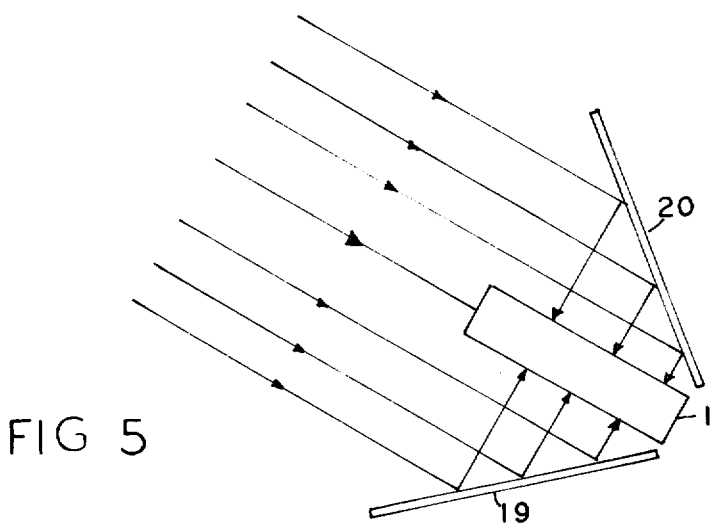
FIG. 5 is a top view of a modification.

FIG. 5 shows modification of the invention wherein the member 1 and cover are transparent to receive radiation from both sides from mirrors 19 and 20.

The pipes 6'-10' may carry any fluid or gas which will transfer the heat. The pipes 6'-10' might be of any cross sectional size. The interior side surface of the member are preferably reflective to gather all energy rays.

I claim:
1. Solar heat collector means comprising,
   a shallow hollow member,
   a transparent cover connected on said member,
   a plurality of load bearing partitions in said hollow member, said cover resting on said partitions,
   a plurality of heat collecting plates in said hollow member spaced between said partitions,
   a plurality of fluid conveying means each connected along one of said collector plates, said fluid conveying means being connected in parallel, inlet and outlet means connected to said fluid conveying means, and means connected to apply vacuum to said hollow member, said partitions being apertured so that the entire hollow member may be evacuated, said partitions being proportioned and spaced so as to support the cover against external atmospheric pressure, whereby conduction and convection losses from said heat collector plates will be minimized because of the vacuum.

2. Apparatus as in claim 1, wherein the hollow member is of transparent material.

3. Apparatus as in claim 1, wherein said outlet means has an expansion loop to compensate for temperature variations.

4. Apparatus as in claim 1, wherein the cover has a modular curved configuration.

* * * * *